(12) United States Patent
Kim et al.

(10) Patent No.: US 11,023,418 B2
(45) Date of Patent: Jun. 1, 2021

(54) KEYWORD-BASED DATA MANAGEMENT SYSTEM AND METHOD

(71) Applicant: Jin Weon Kim, Gyeongsangbuk-do (KR)

(72) Inventors: Jin Weon Kim, Gyeongsangbuk-do (KR); Jun U Kim, Gyeongsangbuk-do (KR); Hong Hyun Kim, Seoul (KR)

(73) Assignee: Jin Weon Kim

( * ) Notice: Subject to any disclaimer, the term of this patent is extended or adjusted under 35 U.S.C. 154(b) by 58 days.

(21) Appl. No.: 16/485,380

(22) PCT Filed: Feb. 7, 2018

(86) PCT No.: PCT/KR2018/001666
§ 371 (c)(1),
(2) Date: Aug. 12, 2019

(87) PCT Pub. No.: WO2018/151458
PCT Pub. Date: Aug. 23, 2018

(65) Prior Publication Data
US 2019/0377710 A1    Dec. 12, 2019

(30) Foreign Application Priority Data
Feb. 15, 2017  (KR) .......................... 10-2017-0020454

(51) Int. Cl.
*G06F 3/048* (2013.01)
*G06F 16/16* (2019.01)
(Continued)

(52) U.S. Cl.
CPC ............ *G06F 16/164* (2019.01); *G06F 16/13* (2019.01); *G06F 16/168* (2019.01);
(Continued)

(58) Field of Classification Search
CPC .......................... G06F 16/164; G06F 16/9566
See application file for complete search history.

(56) References Cited

U.S. PATENT DOCUMENTS

| 7,003,442 B1 * | 2/2006 | Tsuda ...................... G06F 16/93 |
| | | 704/9 |
| 10,209,782 B2 * | 2/2019 | Li .......................... G06F 3/0237 |

(Continued)

FOREIGN PATENT DOCUMENTS

| EP | 2023585 B1 | 3/2013 |
| JP | 4557071 B2 | 10/2010 |

(Continued)

OTHER PUBLICATIONS

International Search Report for International Patent Application No. PCT/KR2018/001666; dated Jun. 7, 2018.

*Primary Examiner* — David E Choi
(74) *Attorney, Agent, or Firm* — Mendelsohn Dunleavy, P.C.

(57) ABSTRACT

The present invention provides a data management system. More specifically, the present invention relates to a keyword-based data management system and method for managing and utilizing multiple pieces of data generated when application programs executed in various types of computing apparatuses are used, and improving a management environment. Proposed according to an embodiment of the present invention is a new procedure for selecting a keyword-of-interest storage before an operation of using a computing apparatus, by classifying data used or collected in the past and storing the same in a keyword-of-interest-based storage. Accordingly, a user can easily access collected data associated with his/her interest, which leads the user to systematically manage data in which the user is interested, and delete and dispose of data in which the user is not interested.

15 Claims, 12 Drawing Sheets

(51) Int. Cl.
  *G06F 16/955* (2019.01)
  *G06F 16/13* (2019.01)
  *G06F 3/0481* (2013.01)
  *G06F 3/0482* (2013.01)

(52) U.S. Cl.
  CPC ........ *G06F 16/9566* (2019.01); *G06F 3/0482* (2013.01); *G06F 3/04817* (2013.01)

(56) References Cited

U.S. PATENT DOCUMENTS

| | | |
|---|---|---|
| 2009/0248615 A1 | 10/2009 | Drory et al. |
| 2011/0019242 A1 | 1/2011 | Tajima et al. |
| 2012/0022854 A1* | 1/2012 | Hoshino ............... G06F 40/268 704/9 |
| 2012/0102569 A1* | 4/2012 | Turbin ................... G06F 21/56 726/24 |
| 2013/0145318 A1* | 6/2013 | Hosotsubo ............ G06F 3/0482 715/811 |
| 2013/0159104 A1* | 6/2013 | Ramaiyer .............. G06Q 30/00 705/14.54 |
| 2014/0081921 A1* | 3/2014 | Pichumani ........... G06F 16/745 707/667 |
| 2014/0310279 A1 | 10/2014 | Taljanovic |
| 2015/0120794 A1* | 4/2015 | Phelan .................... G06F 16/13 707/828 |
| 2017/0024407 A1* | 1/2017 | Park ..................... G06F 3/04842 |
| 2018/0006983 A1* | 1/2018 | Steplyk ................... H04L 51/12 |
| 2018/0067957 A1* | 3/2018 | Paterson ................ G06F 16/13 |
| 2018/0101576 A1* | 4/2018 | Lin ...................... G06F 16/9535 |
| 2019/0377710 A1* | 12/2019 | Kim ..................... G06F 16/164 |
| 2020/0090441 A1* | 3/2020 | Kuenzi ........... H04W 12/00407 |

FOREIGN PATENT DOCUMENTS

| | | |
|---|---|---|
| KR | 10-20090016088 A | 2/2009 |
| KR | 1020130053152 A | 5/2013 |

* cited by examiner

KEYWORD-BASED DATA MANAGEMENT SYSTEM AND METHOD

TECHNICAL FIELD

The present invention relates generally to a data management system and, more specifically, to a keyword-based data management system and method of managing and utilizing multiple pieces of data generated when application programs executed in various types of computing apparatuses are used, and improving a management environment.

BACKGROUND ART

Recently, with the rapid development of information and communication technology, an application program can be downloaded, installed, and used in various types of computing devices such as mobile terminals such as tablets and smart phones, as well as typical types of personal computers (PCs). An application program using such a computing device is widely used not only in business but also in daily life.

A multimedia file including a document file, a memo file, an image, and a video created by various activities of a user in an operating system (OS) used in a general computing device or an application program operating environment, and URL information, data and telephone directory of a web page, a file manager of an operating system, an office application tool, a telephone application program, and the like based on a web browser and an internet connection using the same are only intended to provide the user with a limited function in use.

Accordingly, in the use environment of the computing device, only the minimum functions are provided for storing and managing the generated data, and it is difficult to provide appropriate convenience to a function of managing the data related to the user's personal interest field. It can be seen that the user does not receive appropriate data when necessary, and commercialized applications have a limitation in that they cannot perform functions related to retrieval, classification, and management of the data.

As the use activity of the application program increases according to these limitations, a large amount of data generated is not managed by the computing device but accumulated in the computing device while left unmanaged, whereby the data becomes difficult to manage over time.

For example, referring to FIG. 1, when a user performs document operations through a computing device such as a PC, the user operates a document creation application program W10 to create a document of the desired contents, selects a storage position at a storage point of time in order to store a document file W22 which is a result thereof, that is, a folder W21 in which data is to be stored, and inputs an appropriate file name to store the file in a format of an electronic file.

Herein, the user repeats the above-described operations each time the document is operated, and wishes that the electronic files 21 are classified in folders in accordance with the related subject in many operations. However, since there is no separate data management means, the user will eventually re-select the same storage depending on his/her memory, or create a new storage without selecting a specific storage.

The usage habits of the above-described computing devices are not limited to document operations, and are also applied to operations such as storing favorites or writing memos according to data search results using a web browser.

Generally, users who use mobile terminals such as PCs, which are commercialized computer devices, or mobile terminals such as smart phones and tablets, collectively collect a large amount of data at an available period for a field of interest, that is, a period when the user is interested in a particular keyword-of-interest, and perform use activities such as document creation, Internet search, memo, and telephone conversation with an associated person on application programs in the computing device.

However, since there is no association between use activities of the application program of the computing device in the related art, the use activities are easily forgotten after the usage. In addition, since there is no separate management means, data resulting from the use activities of the application program is not properly managed and utilized.

DISCLOSURE

Technical Problem

The present invention has been made to solve the above problems, and it is an object of the present invention to provide a keyword-based data management system and method that efficiently manages and utilizes, on the basis of a keyword, multiple pieces of data generated and used when using various application programs operated by a computing device that a user possesses.

Technical Solution

In order to achieve the above-described object, a keyword-based data management system according to an embodiment of the present invention includes: a storage unit including one or more pieces of data and having multiple storage folders having upper and lower layers and named after keywords-of-interest; a history providing unit providing a recommendation list for the multiple storage folders by referencing history information including a use history of the keywords-of-interest when executing an application program installed in a computing device, or making a request for a call of an application program associated with a storage folder for a keyword-of-interest selected by providing the recommendation list; a storage folder creation unit creating the storage folder; and a use activity calling unit storing data generated by the application program in the multiple storage folders.

In addition, in order to achieve the above-described object, a keyword-based data management method according to an embodiment of the present invention includes: by a history providing unit, detecting execution of an application program installed in a computing device; by the history providing unit, providing a recommendation list for multiple storage folders included in a storage unit according to history information including a use history of keywords-of-interest associated with the application program in which the execution is detected; by an use activity calling unit, storing data generated by the application program in an associated storage folder; and by the history providing unit, updating the history information according to a usage count of each of the multiple storage folders and data stored in the multiple storage folders.

In addition, in order to achieve the above-described object, a keyword-based data management method according to an embodiment of the present invention includes: by a history providing unit, providing a recommendation list for multiple storage folders included in a storage unit according to history information including a use history of keywordsof-interest; by a use activity calling unit, when any one keyword-of-interest is selected from among the recommendation list, calling an application program associated with the keyword-of-interest; and by the use activity calling unit, storing data generated by the application program in an associated storage folder.

Advantageous Effects

The keyword-based data management system according to the embodiment of the present invention has an effect of minimizing management activities occurring in procedure of use activities of the existing computing device, when performing access, search, and management on various data generated through usage activities such as creating documents, visiting web sites, photographing, creating image and video, use of telephone numbers, visiting web pages, viewing a telephone directory, and the like, in a GUI-based operating system environment or an application program environment such as Windows, Android, iOS, Linux, and the like running on a computing device.

That is, the present invention proposes a new procedure for selecting a keyword-of-interest-based storage before a use activity of a computing device by classifying data used or collected in the past and storing the same in the keyword-of-interest-based storage. Accordingly, a user can easily access the collected data associated with his/her interest, which leads the user to systematically manage data the user is interested in, and to delete and dispose data the user is not interested in.

Since the usage activity and management are separated from each other in the related art, a user directly performs data management activities at various stages. In contrast, the present invention is provided to execute a data management system based on keyword-of-interest in a computing device and check and select the keyword-of-interest used in the past or create or select a keyword-of-interest-based storage and then create or collect the data, in an initial step of creating and collecting the data immediately after the operation.

Therefore, since the usage of the computing device and the classification by the keyword of interest are associated with each other, no separate classification and management activities are required. The data classified into keyword-of-interest provides an effect of improving the user's utilization of data.

Further, the keyword-based data management system according to an embodiment of the present invention is operated as a data management mechanism layer according to the keyword-of-interest-based storage and thus utilized in application programs such as speech recognition and behavior recognition operating in the upper layer, thereby providing the convenience.

MODE FOR INVENTION

Prior to the description, when an element is referred to as "comprising" or "including" a component throughout the specification, it is to be understood that this does not exclude other components, but may further include other components, unless specifically stated otherwise. In addition, the terms "unit" and "module", as used herein, refer to a unit for processing at least one function or operation, and is implemented in software or hardware, and a combination of software and hardware.

Furthermore, the term "embodiment" is used herein to mean serving as an example, instance, or illustration, but the subject matter of the invention is not limited to such example. It is also to be understood that the terms "including" and "having", and other similar terms are used, but are used in a similar manner to the term "comprising", which is a transition word that does not exclude any additional or different components when used in the claims The various techniques described herein may be implemented with hardware or software, or may be implemented with a combination of both, where appropriate. As used herein, terms such as "unit" and "system" may be treated likewise in an equal manner to computer-related entities, that is, software, and a combination of hardware and software, software, or software at the time of execution. Also, in the present invention, both programs and hardware executed in the system can be configured on a module-by-module basis, recorded in one physical memory, or distributed and recorded among two or more memories and recording media.

Hereinafter, a keyword-based data management system and method according to a preferred embodiment of the present invention will be described with reference to the drawings.

Figure 1:
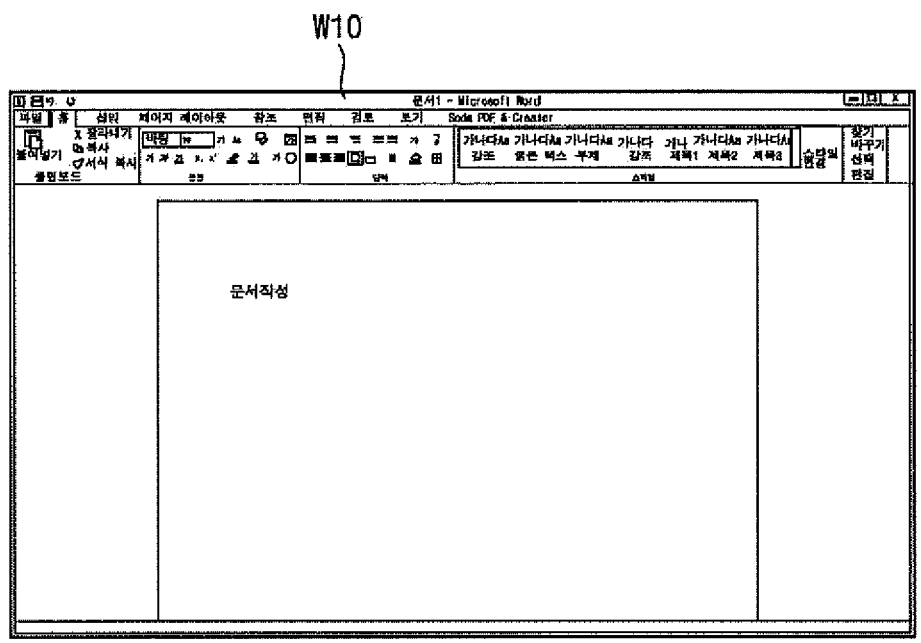
FIG. 1 is a schematic diagram illustrating an example of use of application program data in a computing device in the related art.
Figure 1:
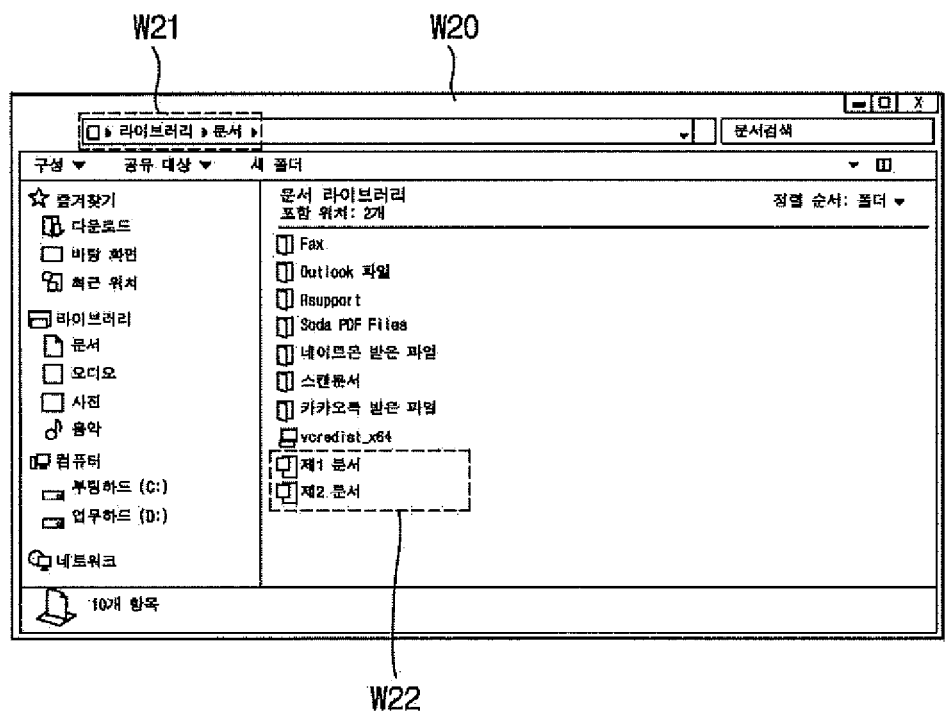
Figure 2:
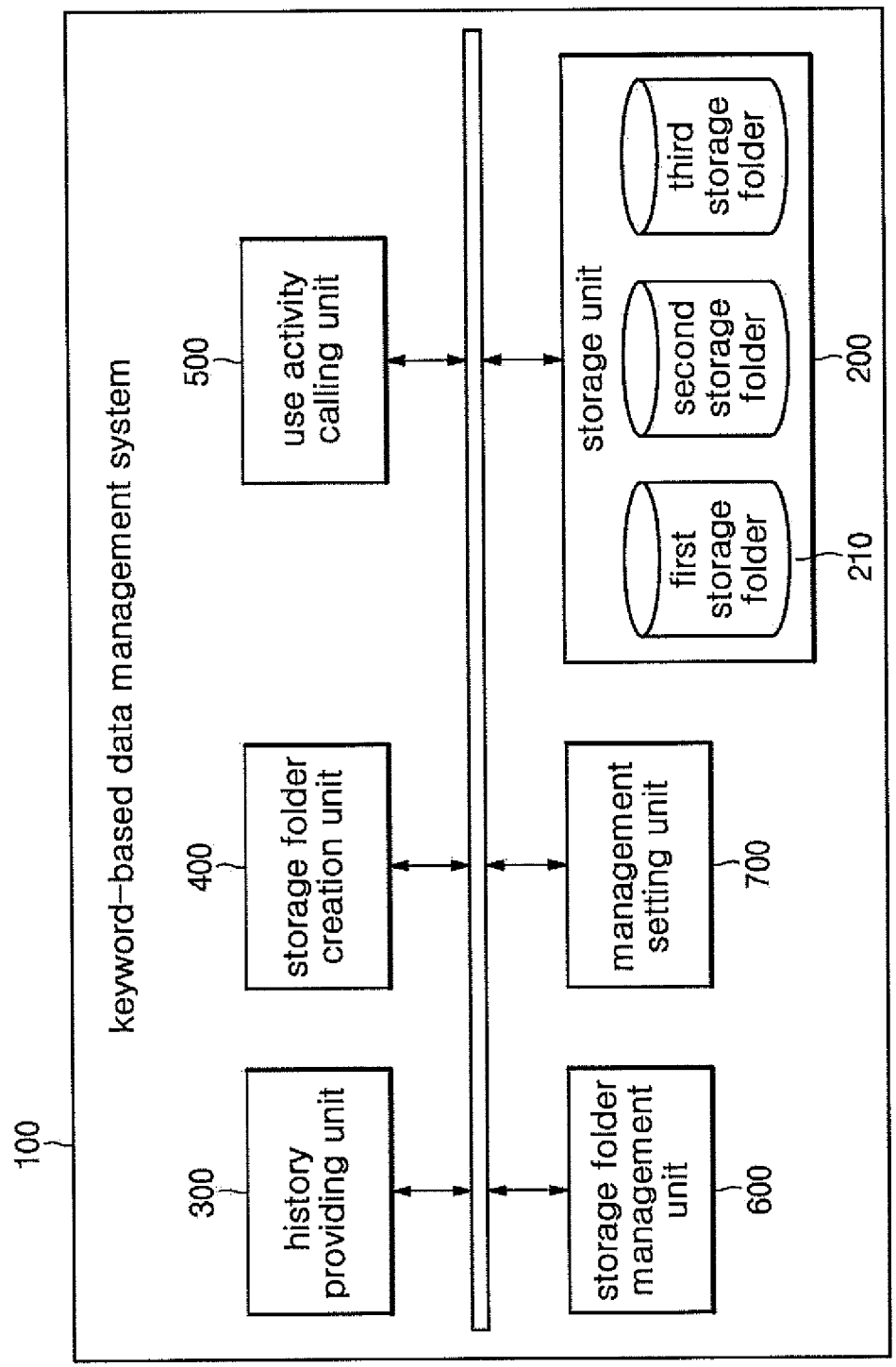
FIG. 2 is a block diagram illustrating a keyword-based data management system according to an embodiment of the present invention.

FIG. 2 is a block diagram illustrating a keyword-based data management system according to an embodiment of the present invention.

Referring to FIG. 2, a keyword-based data management system 100 according to an embodiment of the present invention includes a storage unit 200 that includes one or more pieces of data and has multiple storage folders 210 having upper and lower layers named after interest keywords, a history providing unit 300 that provides a recommendation list for the multiple storage folders 210 by referencing history information including a use history of a keyword-of-interest when executing an application program installed in the computing device, a storage folder creation unit 400 that creates a storage folder 210, and a use activity calling unit 500 that stores data generated by the application program in the multiple storage folders 210.

In addition, the keyword-based data management system 100 according to an embodiment of the present invention includes a storage management unit 600 that creates and deletes storage folders 210 included in the storage unit 200 and data of the storage folders 210, and a management setting unit 700 that arranges a display order of items in the multiple storage folders 210 included in the recommendation list.

The keyword-based data management system 100 may be implemented in a form of a software program installed in a typical computer device and recorded in a predetermined recording medium mounted on the computing device.

The storage unit 200 includes multiple storage folders 210 used for data management using a keyword-of-interest provided by the keyword-based data management system according to the present invention. One or more storage folders 210 may be created, and each of the storage folders 210 may be named after a keyword-of-interest that is defined by a user. Such a storage folder 210 may correspond to a folder that is a subdirectory of a root directory in which a data file provided by a computing device that uses a normal file system is stored.

In addition, the storage folder 210 may have upper and lower layer structures, one or more lower-level storage folders 210 may be stored in the upper-layer storage folder 210, and the sub-lower-layer storage folder 210 may be stored in the lower-level storage folder 210.

In addition, one or more pieces of data in regard to file types may be stored in each storage folder 210. Such data may be data about text document, URL information, an image file, and a video file generated as a result of execution of an application program such as a document creator, a web browser, and a multimedia editor operating on a computing device.

More specifically, types of data capable of being stored in the storage folder 210 include hyperlinked URL information, phone numbers, a voice memo, video, a document file such as a PDF, and an Office file, and other text files, in which a memo scrap format, an image file, and keyword-of-interest are displayed, and the collected URL is displayed when a mouseover is performed.

The name of the data may be made up of a keyword-of-interest, an identification code, or a combination of the keyword-of-interest and the identification code, in which the identification code may be set as file creation date, tag name, or any text selected by a computing device, as well as tag name and text including number, character, and symbol input by the user.

The storage folder 210 of the storage unit 200 and the data stored in the storage unit 200 may be created, deleted and moved by the storage folder creation unit 400 and the storage management unit 600 described later, and the created storage 200 may be managed by causing the history providing unit 300 to reflect a usage count on history information.

The history providing unit 300 serves to provide a keyword-of-interest, that is, a recommendation list for the storage folder 210, at the time of an application program execution which is a use activity occurring in a computing device on the basis of the history information.

The recommendation list is provided to display one or more keywords-of-interest as items. When the keyword-of-interest is selected by the user, the items for the data stored in the storage of the keyword-of-interest may be displayed.

In particular, when the data is a memo file, the size of the keyword-of-interest for the memo file may be about 20 bytes of text in the front part of contents of the memo file. When the data includes words associated with the keyword-of-interest-based storage, the keywords are highlighted together with words before and after the keyword when a mouseover is performed. Also, an image file, an audio file, a video file, and a document file may be provided such that file names thereof are displayed when a mouseover is performed, and the telephone number is displayed with full numbers. Also, depending on the user's choice, the user may return from the data item to the recommendation list back.

In addition, in the memo file, the contents thereof may include text and an image, and URL information that is the source of the text and image. The text of the memo file may have a set attribute value, and the attribute value may include any one of "bold", "quote", "tilt", "strike-out", and "color".

The image included in the memo file may be a file created using copying in the image-related program or a camera program. In the case of an image file copied from an external transfer image file or a web browser, the original URL information is recorded, so that the URL information may pop up on the image when a mouseover is performed. In addition, when the URL information popped up is selected by the user, a predetermined web browser is called and directed to the corresponding web site.

When the URL information is included in the generated data, the history providing unit 300 displays the URL information together with the recommendation list. When the URL displayed by the user is selected, the history providing unit 300 calls the application program including the web browser so that the screen may be changed to the corresponding website. The telephone number corresponds to a case where the data is a pattern consisting of numbers and "-". when there is a matching telephone number by searching the telephone number stored in the computing device using those numbers, the information of the telephone number may pop up. In addition, at the time of a selection click, it is possible to call a telephone application program to make a call, or to call a corresponding application program to edit a telephone number.

Meanwhile, when an external application program is called on the screen that displays the data item and the corresponding application program is terminated, the screen may be rolled back to the final screen.

The application program may be a file search manager, a memo note, an Internet browser, a photographer, a voice recorder, a telephone directory, etc., executed in a computing device. When the user executes the application program, the recommendation list is generated and provided using the history information in which the usage count of the keyword-of-interest used in the past is recorded.

The user may select any one keyword-of-interest in the recommendation list and store the data.

Here, each item of the recommendation list corresponds to a keyword-of-interest, and is provided in an order arranged according to the criteria set in the management setting unit 700, as a name of each storage folder 210 created by the user in the past.

In addition, information included in the recommendation list and displayed on the screen includes a keyword-of-interest name, the last editing date and time of the recommendation list, the number of pieces of memo data in storage, a usage count of the keyword-of-interest, and the like. Here, the usage count may be incremented every time data is added, modified, or inquired for a keyword-of-interest.

The setting criterion of the management setting unit 700 may be set according to an order of the recent usage time, the number of times of use, and the storage name characters for the corresponding keyword-of-interest.

The storage folder creation unit 400 serves to create each of storage folders 210 of the storage unit 200. When the user receives a recommendation list from the history providing unit 300 and confirms the same. Here, when there is a desired keyword-of-interest, the user selects the same and stores the same in the storage folder 210. However, when there is no desired keyword-of-interest, the user may create a storage folder 210 by setting a new keyword-of-interest, and the storage folder creation unit 400 creates a storage folder 210 having the set keyword-of-interest as a name thereof. Here, the storage folder creation unit 400 may generate a data file for recording a usage count of the storage folder 210.

The use activity calling unit 500 serves to call an additional application program in order to generate data to be stored in the storage folder 210 for the keyword-of-interest, which is selected by the user. The storage folder 210 selected by the user may store data according to other various application programs in addition to the application currently being executed. For example, when the user executes the current document creator program to store the document file in the selected storage folder 210, it is possible to store an image file, a wave file, an attachment file, a database file, and the like that are generated by calling the application program such as a camera, audio recording, e-mail, and telephone directory for the same storage folder 210.

The storage management unit 600 provides a function of managing the storage folder 210 separately from a specific application program. In detail, according to a user's selection, the storage management unit 600 may arbitrarily create one or more storage folders 210, or delete one or more storage folders 210 included in the storage unit 200, or move data in the same to another storage, and create or delete one or more data in the storage folder 210, or move the same to another storage.

To this end, the storage management unit 600 may provide a predetermined interface for the user to select the functions described above.

In addition, the storage management unit 600 provides a function of setting a data list for data in each of storage folders 210 and an arranging order of items in the data list. As an example, the items in the data list may be arranged on the basis of creation date, type, and name of each data.

In addition, the storage management unit 600 further provides a function of collecting multiple pieces of data stored in the storage folder 210 to generate a integrated document report file, a low classification recommendation function for the data, a storage reclassification function, and a launcher providing function that allows the user to directly select and execute the data, and a detailed description of these functions will be described later.

The management setting unit 700 provides a function of setting an arranging order of items in the recommendation list provided by the history providing unit 300. The items of the recommendation list may be arranged on the basis of recent usage time, or may be arranged on the basis of the usage count of the user. The management setting unit 700 changes items order of the recommendation list according to user's selection.

According to the above-described structure, the keyword-based data management system of the present invention is provided so that a user who uses various application programs via the computing device checks a recommendation list of storage named after a keyword-of-interest according to the usage count of the program and then stores the resultant data of the application program in an appropriate storage, thereby managing systematically the data.

Hereinafter, the structure of each component constituting the keyword-based data management system according to an embodiment of the present invention will be described in detail with reference to the drawings.

Figure 3:
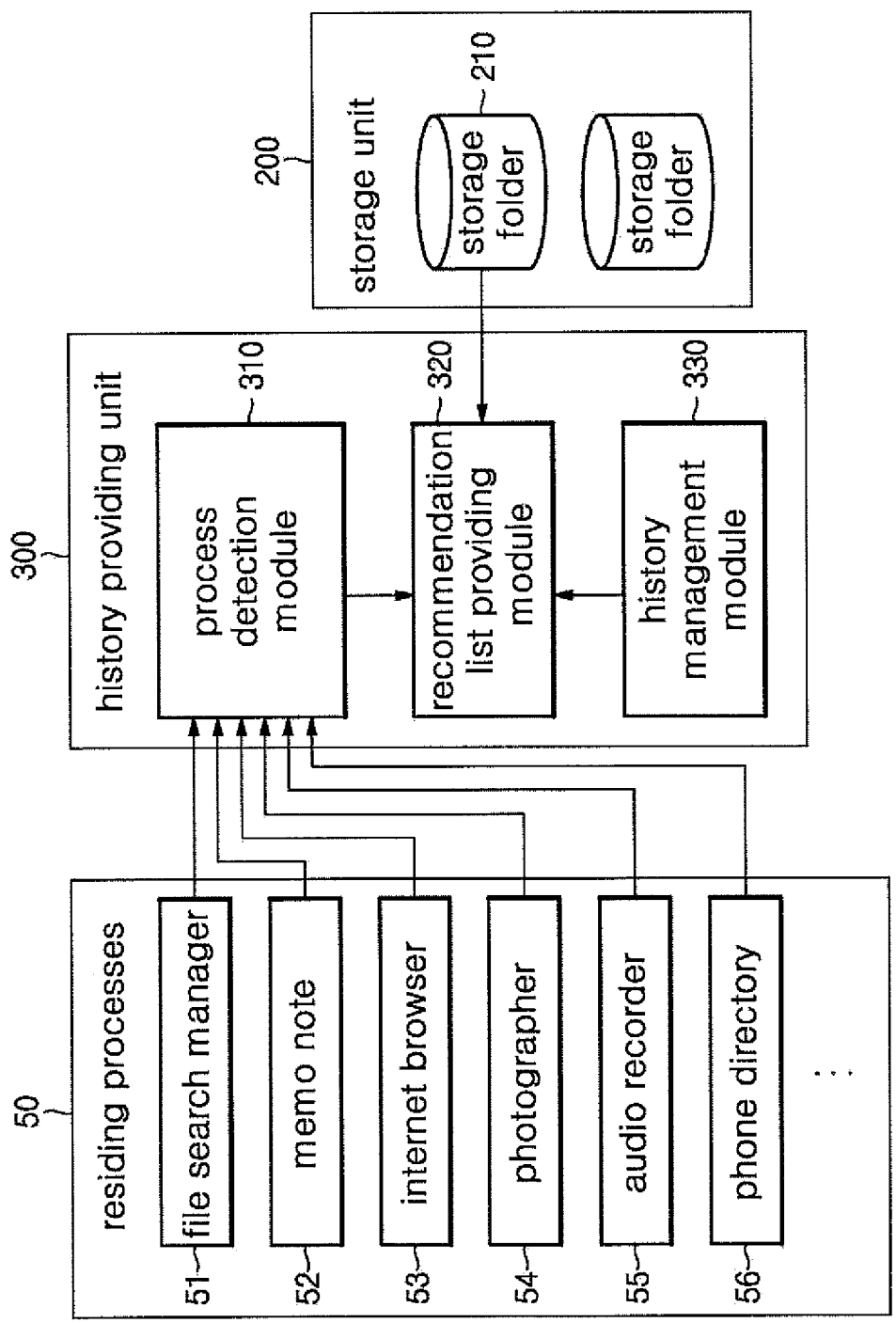
FIG. 3 is a block diagram illustrating the structure of a history providing unit of a keyword-based data management system and components associated therewith according to an embodiment of the present invention.

FIG. 3 is a block diagram illustrating the structure of a history providing unit of a keyword-based data management system and components associated therewith according to an embodiment of the present invention.

Referring to FIG. 3, a history providing unit 300 according to an embodiment of the present invention provides a recommendation list for a keyword-of-interest when an application program is executed on the basis of history information. To perform such function, the history providing unit 300 includes a process detection module 310 that detects processes 51 to 56 residing in the memory 50 as the application program is executed, a recommendation list providing module 320 that extracts one or more storage folders 210 associated with the application program corresponding to the detected processes from the storage unit 200 and providing a recommendation list for the extracted storage folder 210 and a use of keyword, and a history management module 330 that updates the history information according to a usage count of the keyword-of-interest.

The process detection module 310 detects a process that resides in the memory 50 and determines which application program is executed, as a predetermined application program is executed in the computing device. In addition, the recommendation list providing module 320 refers to the history information and provides a recommendation list for the storage folder 210 associated with the application program among the storage folder 210 included in the storage unit 200.

When any one keyword-of-interest is selected and used in the recommendation list by the user, the history management module 330 reflects or updates the usage count thereof to the corresponding keyword-of-interest. The usage count is recorded in the form of metadata and managed so that the number of uses is accumulated for each use.

As an example, when the process of the photographic camera 54 resides in the memory 50, as the process detection module 310 provides the detected contents to the recommendation list providing module 320, it is determined that the photographing machine program is executed. The recommendation list providing module 320 displays a recommendation list having, as items, keyword-of interest of the storage folders 210 storing an image file and a video file capable of being generated by the program. The user may select the keyword-of-interest listed in the recommendation list to store the image file and the video file in the storage.

Figure 4:
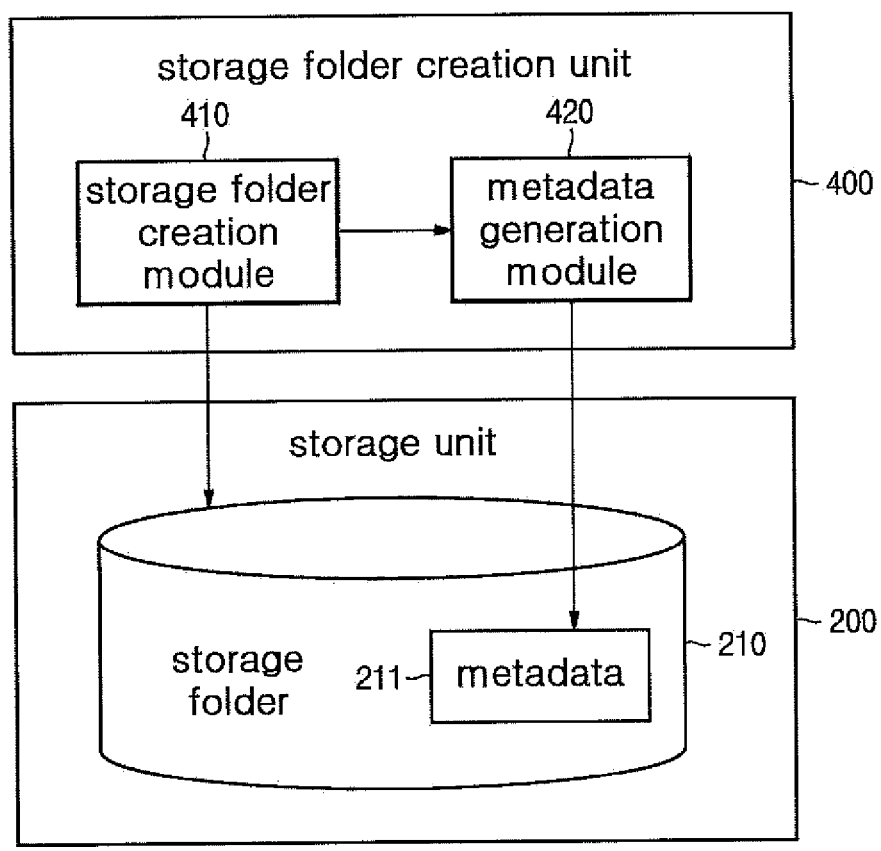
FIG. 4 is a block diagram illustrating the structure of a storage generation unit of a keyword-based data management system and components associated therewith according to an embodiment of the present invention.

FIG. 4 is a block diagram illustrating the structure of a storage generation unit of a keyword-based data management system and components associated therewith according to an embodiment of the present invention.

Referring to FIG. 4, the storage folder creation unit 400 according to the present invention creates storage folders 210 of the storage unit 200, and provides a creation button separately from the recommendation list, and includes a storage creation module 410 that creates a keyword-of-interest and a storage named the keyword-of-interest by using a name input when the user select the creation button, and a metadata generation module 420 that creates metadata in which the usage count of the storage folder 210 generated by the storage generation module 410 is recorded.

The keyword-based data management system provides a function of allowing the user to create a keyword-of-interest that does not exist in the recommendation list on the recommendation list providing screen. The storage generation module 410 generates a create button on the screen, and when the creation button is selected by the user, a new storage folder 210 named after a keyword-of-interest is created in the storage unit 200.

When the new storage folder 210 is created, the metadata generation module 420 generates metadata for processing a usage count for the new storage folder 210, and stores the metadata in the corresponding storage folder 210.

Figure 5:
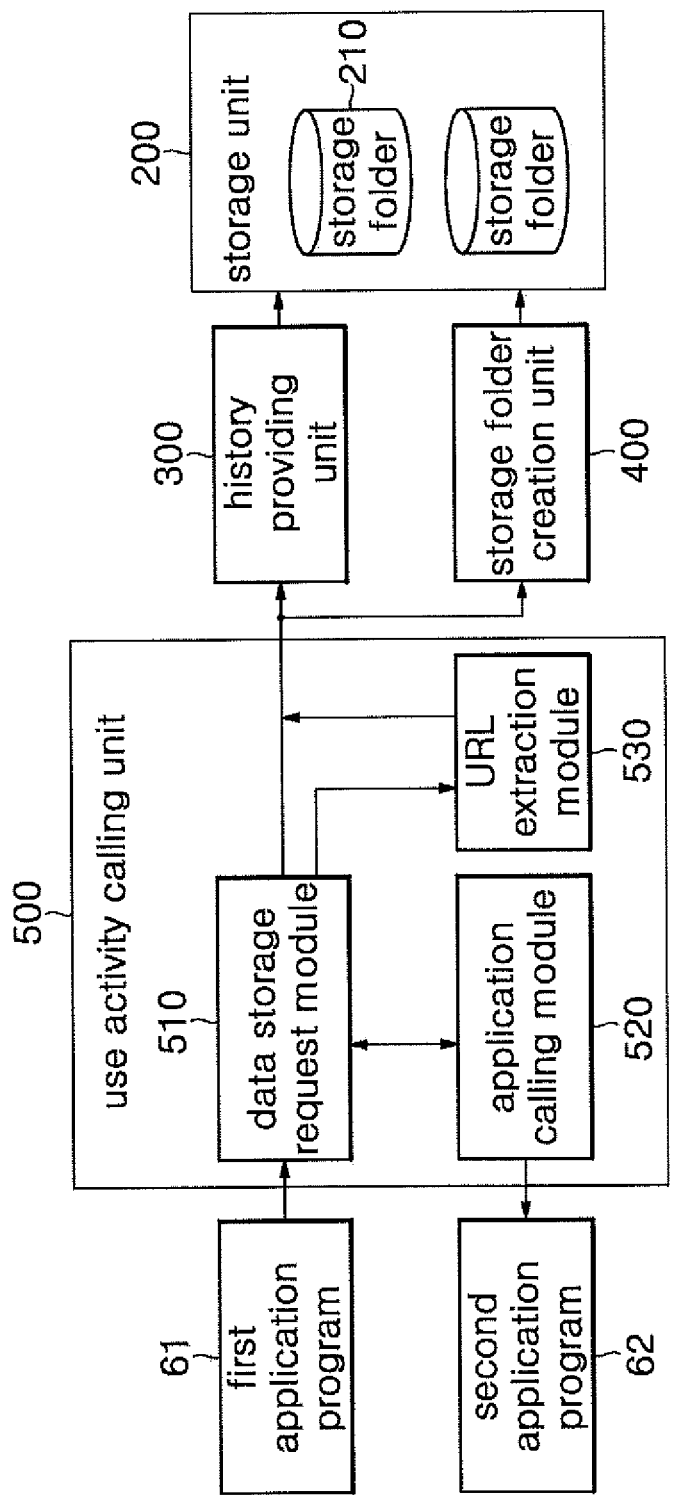
FIG. 5 is a block diagram illustrating the structure of a use activity calling unit of a keyword-based data management system and components associated therewith according to an embodiment of the present invention.

FIG. 5 is a block diagram illustrating the structure of a usage activity calling unit of a keyword-based data management system and components associated therewith according to an embodiment of the present invention.

Referring to FIG. 5, the use activity calling unit 500 of the present invention is provided to call an additional application program for generating data to be stored in the storage folder 210 for a keyword-of-interest selected by a user. The use activity calling unit 500 includes a data storage request module 510 making a request to the history providing unit 300 or the storage folder creation unit 400 for storage of data generated in an application program being executed in an associated storage folder 210, an application calling module 520 calling another application program for generating and storing additional data for the associated storage folder 210, and a URL extraction module 530 extracting the URL information included in the execution of the application program and inserting the URL information into the data of the associated storage.

When the storage folder 210 is selected among from the recommendation list by the history providing unit 300 or the storage folder 210 is created by the storage folder creation unit 400, the data storage request module 510 stores the data generated in the application program 61 that is currently executed, in the storage folder 210.

The application calling module 520 calls another external application program 62 and stores the data generated therefrom in the storage folder 210 being used by the data storage module 510 in addition to the application program 61 that is being currently executed. Herein, a launcher may be used.

In particular, when a predetermined keyword-of-interest is selected by the user, the application calling module 520 includes a function of providing an icon list for the external applications capable of being called by inputting the selected keyword-of-interest as an argument value. In detail, when the keyword is selected, the application calling module 520 resides the keyword in the memory and displays an icon list window including icons of one or more external application programs 62 on the screen. Thereafter, when one of the external application programs 62 is selected by the user, the application calling module 520 calls the external application program 62 and, at the same time, executes a function provided by the external application program 62 by inputting a keyword residing in the memory as an argument value As an example, when the called external application program 62 is a web browser, the search is performed by inputting a keyword into the search window in the form of text.

In addition, in the case that the application program 61 is a Web browser, when a multimedia file such as image, audio, and movie included in the currently opened Web page is stored in the storage folder 530 as data, the URL extraction module 530 extracts the URL information of the web page and stores the same together with the data. Such URL information may be used later when opening the web page for the URL address, in the case that the corresponding data is executed.

Figure 6:
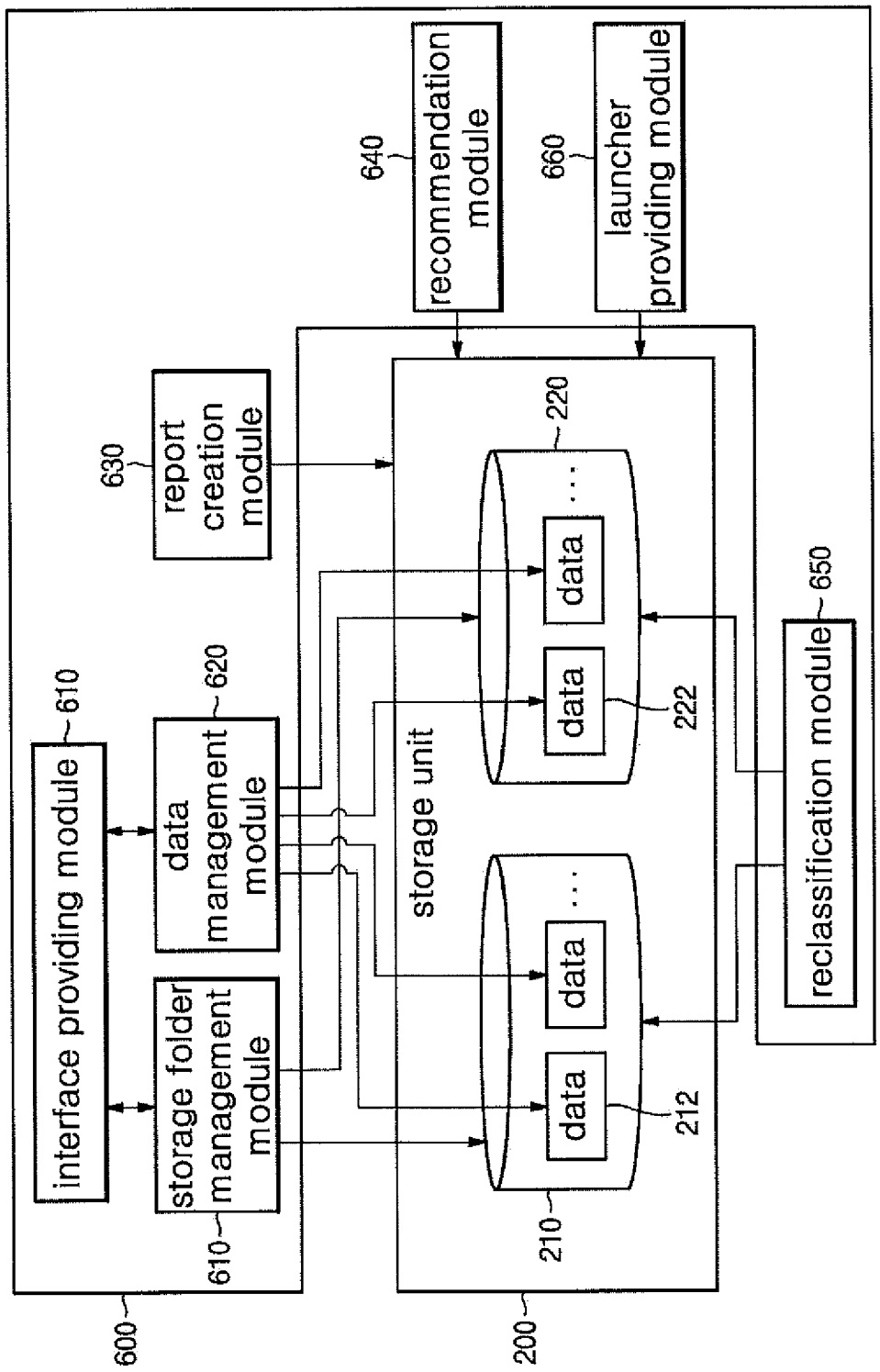
FIG. 6 is a block diagram illustrating a structure of a storage management unit of a keyword-based data management system and components associated therewith according to an embodiment of the present invention.

FIG. 6 is a block diagram illustrating a structure of a storage folder management unit of a keyword-based data management system and components associated therewith according to an embodiment of the present invention.

Referring to FIG. 6, the storage management unit 600 according to the present invention is provided to set a data list for data 212 and 222 in each storage folder 210 and 220 and an arranging order of items in the data list. The storage management unit 600 includes a storage management module 610 that creates or deletes storage folders 210 and 220, a data management module 620 that creates or deletes data 212 stored in the storage folders 210 and 220, or moves the data 212 stored in the first storage folder 210 to the data 222 of the second storage folder 220, a report creation module 630 that collects multiple pieces of data 212 and 22 stored in the storage folders 210 and 220 to generate a single integrated document report file according to a generated order, a recommendation module 640 that extracts a noun from text included in multiple pieces of data 212 stored in one storage folder 210 and generating a sub-classified storage to perform movement of the corresponding data in proportion to a usage count of the extracted noun, a reclassification module 650 that resets the current layers of all the storage folders 210 and 220 including the sub-classified storage folder to an upper layer or a lower layer, and a launcher providing module 660 that provides a launcher calling the application program associated with the selected data 212 and 222 when any one data 212 or 222 stored in the storage folders 210 and 220.

The storage management module 610 serves to manage the storage folders 210 and 220 in a keyword-based data management system separately from the execution of a predetermined application program. The storage management module 610 sets a keyword-of-interest according to user's selection irrespective of whether the application program is currently executed or not, thereby creating or deleting arbitrarily the storage folders 210 and 220.

In addition, the storage folder management module 610 may provide an editing function for the keyword-of-interest in the recommendation list. The storage folder management module 610 may set an arranging order of keywords-of-interest according to the latest edition date, the name of keyword-of-interest, the number of pieces of data in the storage folder, and the usage count, and the like.

Similarly, the data management module 620 may create or delete the data 212 in any one storage folder 210, or move the data 212 to another storage folder 220, in accordance with a user's selection.

The report creation module 630 provides a function of collectively managing multiple pieces of data 212 and 222. The report creation module 630 arranges items of all the data 212 and 222 stored in each of the storage folders 210 and 220 according to a creation order, thereby creating a report file which is a type of document file.

The user may edit the created workbook report file and thus process the same into a desired document.

The recommendation module 640 provides a low recommendation function for the data 212, 222 stored in the storage folders 210 and 220. The small recommendation function is to sub-classify the data using a noun included in the data 212 and 222. The recommendation module 640 determines the number of nouns included in the contents capable of being recognized as text in the data 212 and 222, for example, the content of the document file, the contents of the memo, the name of the image file, the source URL information in attributes of the image file, the name of a movie file, the source URL information for the movie file, the name of an audio file, the source URL information for the audio file, and the like, and calculates the usage count thereof, thereby creating a sub-classified storage folder (not shown) having the noun with the highest usage count as a name thereof. Then, the data 212 and 222 including the corresponding noun are moved to the generated sub-classified storage folder.

The reclassification module 650 serves to move a specific storage folder 210 or 220 to an upper layer or a lower layer for all the storage folders 210 and 220 and the sub-classified storage folder included in the storage unit 200. For example, assuming that the first storage folder 210 is a lower-level storage folder that is stored in the second storage folder 220, the first storage folder 210 is moved to the same to or upper-layer directory of the second storage folder 220, and the second storage folder 220 is moved to the first storage folder 210.

The launcher providing module 660 serves to provide a launcher for directly executing the data 212 and 222. When the user selects one of the data 212 and 222, the launcher calls and executes application program connected thereto, thereby checking the contents of the data 212 and 222. For example, when the data 212 and 222 are document files, a document creator program is executed to display the contents thereof, and when they are multimedia files, a video player or the like is executed to reproduce the video.

Figure 7:
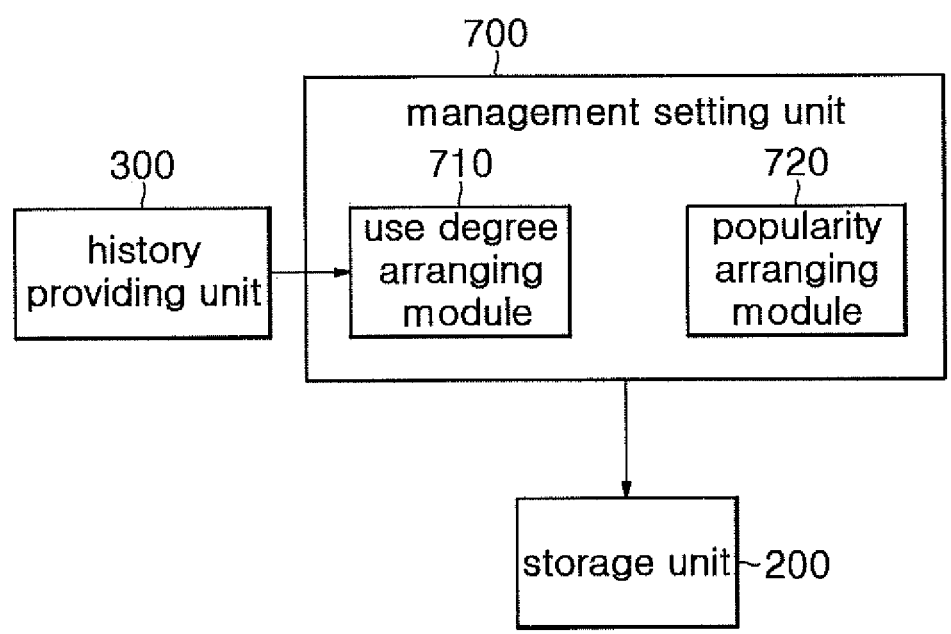
FIG. 7 is a block diagram illustrating the structure of a management setting unit of a keyword-based data management system and components associated therewith according to an embodiment of the present invention.

FIG. 7 is a block diagram illustrating the structure of a management setting unit of a keyword-based data management system and components associated therewith according to an embodiment of the present invention.

Referring to FIG. 7, the management setting unit 700 of the present invention serves to provide a function of setting an arranging order of items of a recommendation list to be provided to a user. The management setting unit 700 determines a display order of the recommended list in ascending order or descending order, according to any one of character orders of the last usage time, usage count, and name for multiple keywords-of-interest by referencing the storage unit 200 with respect to items of a recommendation list provided from the history providing unit 300. The usage count recorded in the metadata may be used as the referenced information.

To this end, the management setting unit 700 includes a use degree arranging module 710 that arranges the display order of the items in the recommendation list according to the usage time for the multiple keywords-of-interest, and a popularity arranging module 720 that arranges the display order of the items in the recommendation list according to the number of times of use for the multiple keywords-of-interest.

Hereinafter, a data management method performed by the keyword-based data management system according to the present invention having the above-described structure will be described with reference to the drawings.

Figure 8:
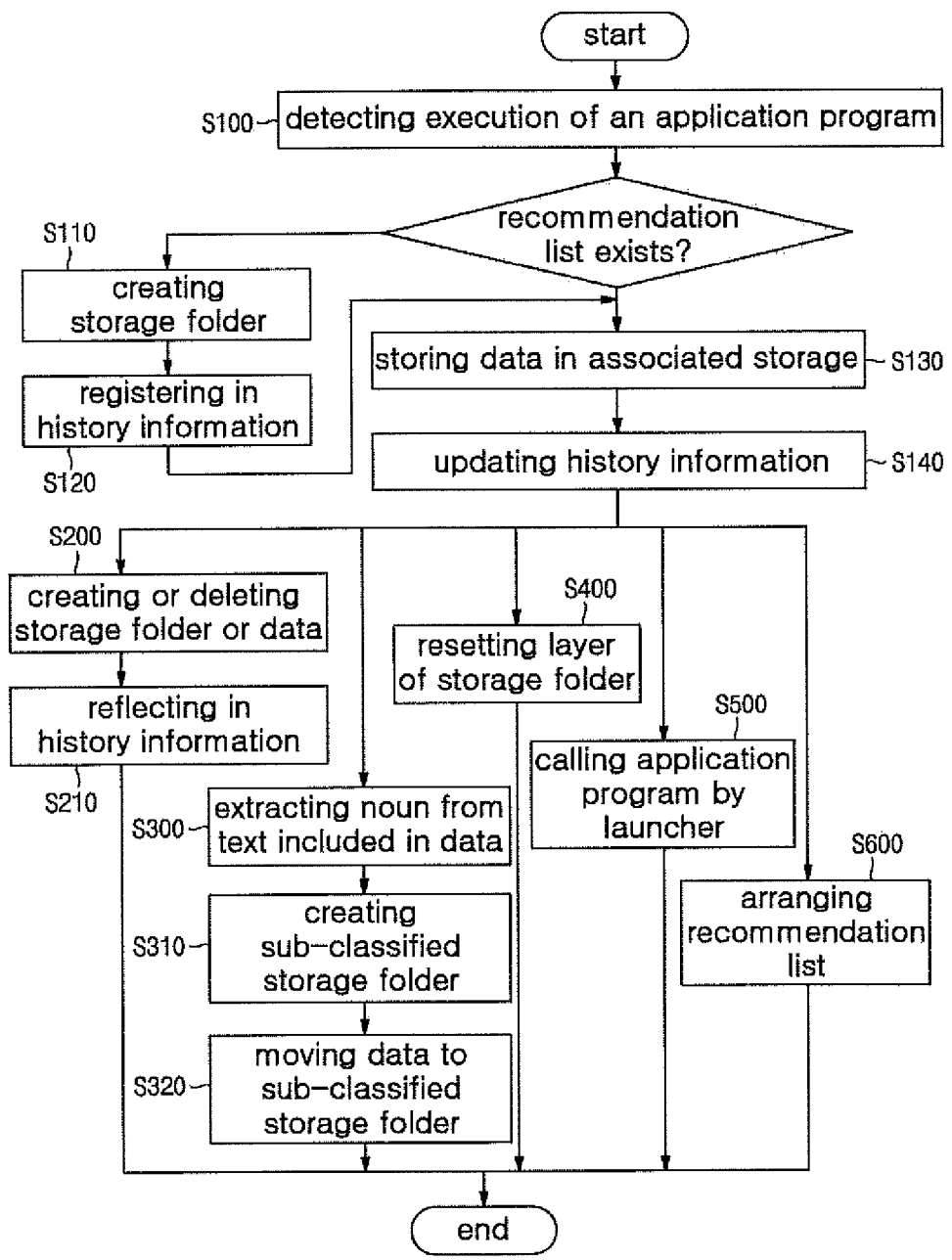
FIG. 8 is a flowchart illustrating a keyword-based data management method according to an embodiment of the present invention.

FIG. 8 is a flowchart illustrating a keyword-based data management method according to an embodiment of the present invention.

Referring to FIG. 8, a keyword-based data management method according to an embodiment of the present invention includes detecting execution of an application program (S100), creating a storage folder when a recommendation list does not exist (S110), registering the same in history information (S120), providing the recommendation list and storing the data in the associated storage folder when the recommendation list exists (S130), and updating the history information (S140).

In more detail, the detecting of the execution of the application program (S100) is a step in which the history providing unit detects the execution of the application program installed in the computing device. As the user operates the computing device and executes the application program installed in the computing device, the history providing unit detects the process residing on the memory and thus detects the application program that is being executed.

In step S110, when the recommendation list does not exist, the user selects the recommendation list and a provided create button, and the storage folder creation unit creates at least one storage folder.

Here, in the case that the user inputs the keyword-of-interest to create a storage folder, when a storage folder of the same name exists, the process proceeds to the step S120. To this end, the storage folder creation unit may further perform a step of matching the input string with an existing keyword-of-interest.

The registering in history information S120 is a step in which the history providing unit registers the use history of the keyword-of-interest for the storage folder in the history information. Then, the user may perform data management using the generated keyword-of-interest.

Next, when the recommendation list exists, the system provides the recommendation list to the user. This is a step in which the history providing unit provides the recommendation list of multiple storage folders included in the storage unit according to history information including the use history of keyword-of-interest associated with the application program detected to be executed. The history information includes the use history for the keyword-of-interest, which may be calculated by metadata stored in the storage folder. The history providing unit determines a display order of keywords-of-interest according to the use history, and displays the recommendation list of keywords-of-interest according to the order on the screen. The user may select a desired keyword-of-interest among from the items in the recommendation list.

Subsequently, the storing of the data in the associated storage folder (S130) is a step in which the use activity calling unit stores the data generated by the application program in the associated storage folder. Herein, the user may select the desired keyword-of-interest and store the data generated in the running application program in a storage folder having the selected keyword-of-interest as a name thereof.

Here, when the data is a memo file created by the memo writing program, the constraint condition is set so that the data may be stored only in storage folder according to keyword-of-interest.

Next, the updating of the history information (S140) is a step in which the history providing unit updates the history information according to the usage count of the multiple storage folders and the data stored in the multiple storage folders. Here, since the data is stored using the keywords-of-interest selected by the user, the usage count of the corresponding keyword-of-interest is increased, and the system reflects this.

Meanwhile, after the updating of the history information (S140), the keyword-based data management system according to the present invention may provide various data management functions according to the user's selection.

First, after updating the history information (S140), the data management method performed by the keyword-based data management system according to the present invention includes allowing the storage folder management unit to create or delete the storage folders included in the storage unit or the data in the storage folders (S200) and allowing the history providing unit to reflect the use history of the keyword-of-interest for the storage folder or data created or deleted on the history information (S210).

In particular, in step S200, a keyword-of-interest is immediately generated in an input window of a keyword-of-interest by providing a folder-type icon, and when the keyword-of-interest of the same name exists, the storage folder management unit displays a warning on the screen that it is impossible to create the storage folder.

In addition, the storage folder management unit has functions of selecting a storage folder color in which the basic color is set to yellow when the storage folder is created and generating an "unclassified" storage folder in initial installation of the system to store scrap data in which the keyword-of-interest is not present.

Herein, when storing the scrap data in the "unclassified data", the storage folder management unit may automatically set the tag name of the scrap data according to the user's input. For example, when the captured image file is stored as the scrap data, the user may store the data with the capture date as a name thereof, or store the data in the storage folder having the corresponding tag name as keyword-of-interest by setting a combination of the tag name and the capture date.

In addition, the method of providing the sub-classification recommendation function includes a step in which the storage folder management unit extracts a noun from the text included in multiple pieces of data stored in one storage folder (S300), a step in which the storage folder management unit creates the sub-classified storage folder in proportion to a usage count of the extracted noun (S310), and a step in which the storage folder management unit moves the corresponding data to the sub-classified storage folder (S320).

In addition, a method of providing the storage folder reclassification function may include a step in which the management setting unit resets the current layer of all the storage folders to the upper or lower layer (S400), and a method of providing a function of a launcher to call the application may include a step in which the management setting unit calls the application program associated with the data for which the provided launcher is selected (S500), when any one of pieces of data stored in the storage folder is selected.

A method of providing a function of arranging a recommendation list may include a step in which the management setting unit arranges the display order in ascending or descending order according to any one of character orders of the latest usage time, the usage count, and the name of the keyword-of-interest steps for multiple storage folders in the recommendation list (S600).

Hereinafter, technical features of the present invention will be described through an example of an execution screen of a keyword-based data management system according to an embodiment of the present invention, with reference to the drawings.

Figure 9:
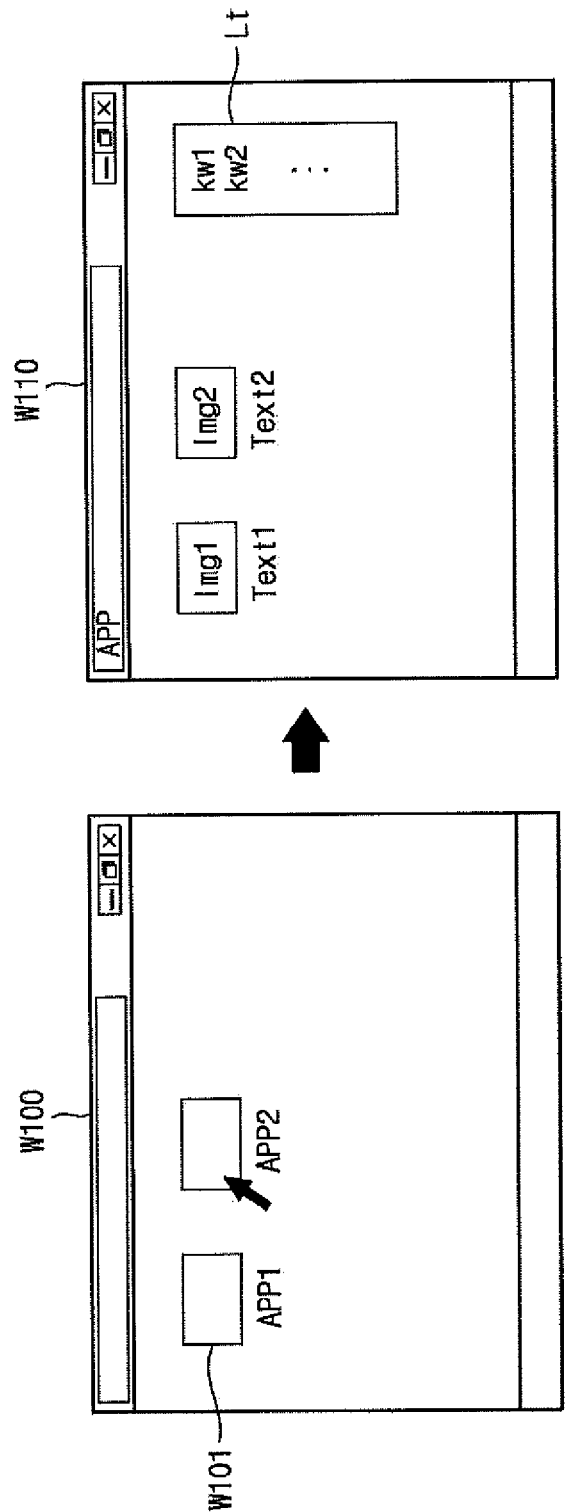
FIGS. 9 to 11 are diagrams illustrating screens provided when each function of the keyword-based data management system is performed according to an embodiment of the present invention.
Figure 10:
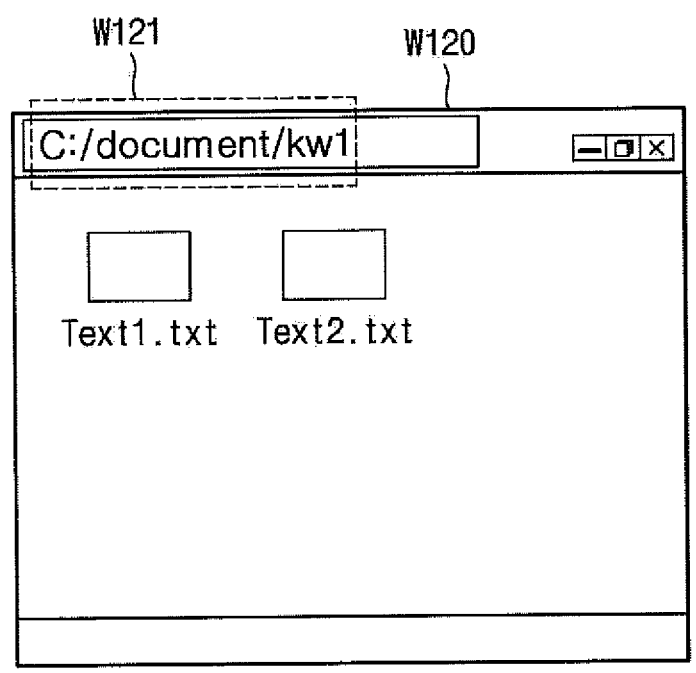
Figure 11:
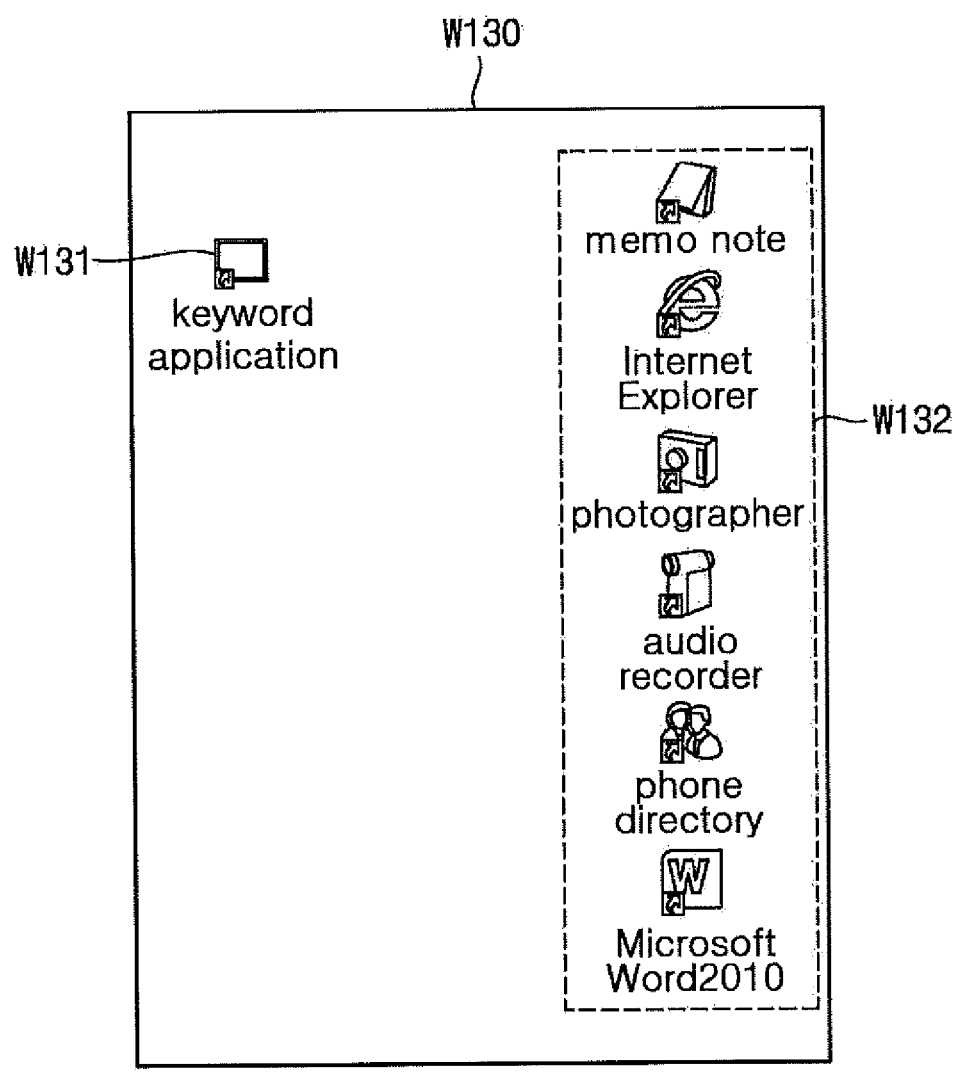

FIGS. 9 to 11 are diagrams illustrating screens provided when each function of the keyword-based data management system according to an embodiment of the present invention is executed Referring to FIG. 9, when a user selects any one of icons W101 of predetermined application programs App1 and App2 such as document creators on the wallpaper W100 of the computing device, the execution screen W110 of the corresponding application program App2 is displayed. Herein, the process of the application program App2 resides in the memory, and the keyword-based data management system according to the present invention detects the corresponding process to determine which program is being executed.

When the user performs an operation on the execution screen W110 and generates and stores a document file including one or more images Img1 and Img2 or text Text1 and Text2, the keyword-based data management system may provide a recommendation list Lt as one area of the execution screen W110.

In items of the recommendation list Lt, keywords-of-interest kw1 and kw2 according to the previously stored storage folder may be sequentially displayed according to the usage counts thereof. Subsequently, referring to FIG. 10, when a user selects any one keyword-of-interest (kw1) and stores a document file, data "Text1.txt" and "Text2.txt" corresponding to the document file is created in "C:/document/kw1" which is a directory of the storage folder having the keyword-of-interest (kw1) selected on the storage folder screen W120 as a name thereof.

Referring to FIG. 11, when the user clicks the icon W131 of the keyword application program according to the present invention on the wallpaper W130 of the computing device to select a keyword, an icon list window W132 for an external application program called by inputting the keyword selected as an argument value may be displayed on the right of the wallpaper W130.

When any one external application programs is executed on the icon list window W132, the selected keyword is transmitted as an argument value of the executed external application program.

For example, when the web browser is executed, the selected keyword is input as the argument value in the form of text on a search window of a web browser to perform the search. When a telephone application program is executed, the phone number is transmitted as the argument value to perform dialing.

Figure 12:
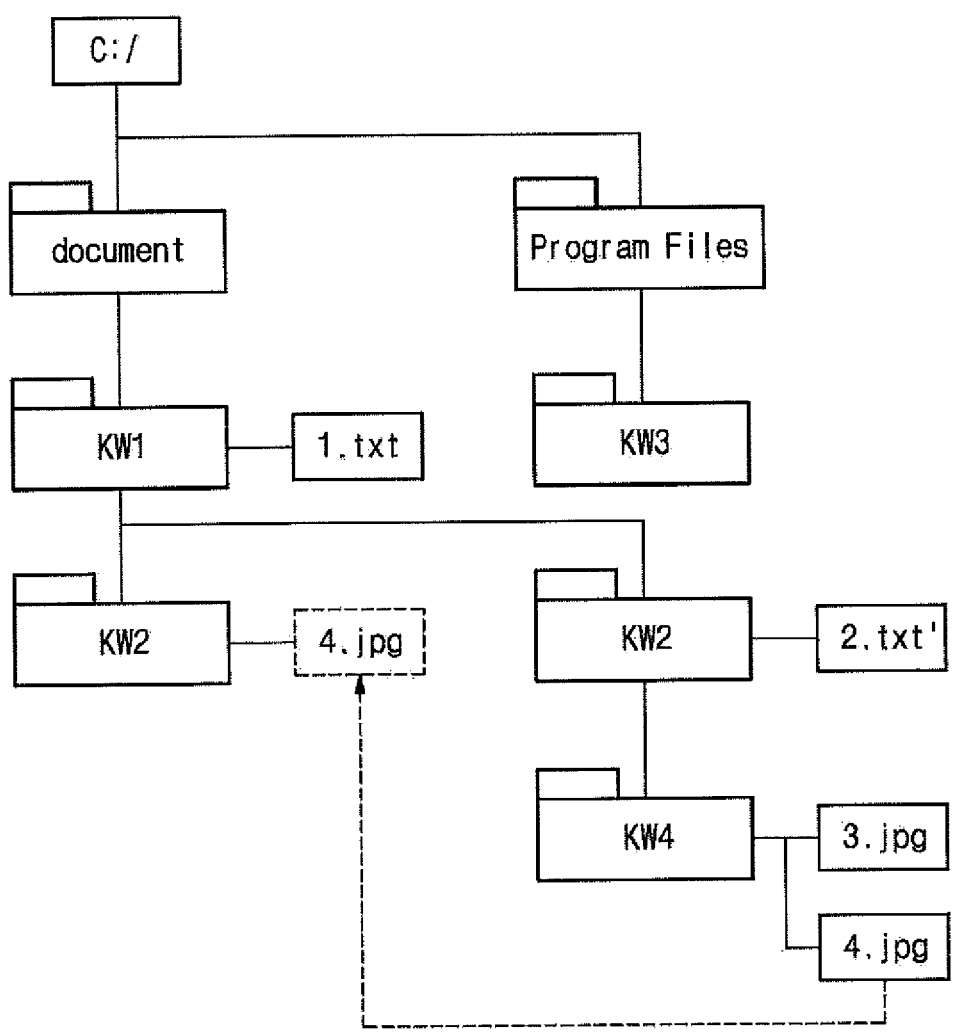
FIG. 12 is a schematic diagram illustrating a directory structure of a storage used in the keyword-based data management system of the present invention.

FIG. 12 is a schematic diagram illustrating a directory structure of a storage folder used in the keyword-based data management system of the present invention.

Referring to FIG. 12, a folder "Document" and a folder "Program Files" may be located in a lower layer of a root directory "C:/", and a storage folder "KW1" in which data "1.txt" is stored is located in a lower layer of the folder "document". In addition, a storage folder "KW3" is located in a lower layer of the folder "Program Files".

When the user selects "KW2" as the keyword-of-interest using the document creator program and stores the document file, the data "2.txt" is stored in the storage folder "KW2" as shown in FIG. 12.

In addition, each storage folder and data may be created, deleted and moved according to the user's option, and further moved between layers. As an example, a file "4.jpg"

of a storage folder "KW4", which is a lower layer of the storage folders "KW1" and "KW2", may be moved to the storage folder "KW2".

Meanwhile, the keyword-based data management system according to the present invention is inserted into a predetermined application program in the form of plug-in and thus executed when the program is executed, in which the data generated in execution of the program is managed.

As an example, when the plug-in program is a web browser, the search term used in the search is stored in the buffer as an identifier associated with the metadata in the storage folder. Here, the association identifier is maintained in the buffer and thus utilized according to the situation when the search term is changed or before the web browser is terminated.

Accordingly, upon moving from the search result to any one web page according to the user's selection, when the user selects a function "sharing" on the web page, sending to the keyword-based application program is added in addition to electronic mail, message sending, and other application program, and the storage folders containing the search term may be displayed in the already created storage folder.

For example, when a user selects a particular storage folder, the corresponding web page is stored in the storage folder. Herein, the original URL information may be stored together. In addition, for the multimedia file or the document file in the web page, the corresponding file and the original URL information are stored by the user according to the function "sharing".

In addition, the keyword-based data management system according to the present invention may further include a function of managing images captured by other application programs.

In detail, when a screen capture function supported in a computing device environment such as a mobile terminal is executed, the keyword-based data management system may store the image file according to the tag name input by the user, or store the same in a folder "unclassified" having "tag name+date time" as a file name thereof.

Also, in the case of a web browser, the system may store the file in the folder "unclassified" having "tag name+keyword+date time" set by referencing the keyword recorded in the buffer, as a file name.

Accordingly, the user can further classify the automatically classified and stored image files on the basis of the keyword-of-interest through the keyword-based data management system.

Even though disclosed in the foregoing description, it should be construed as an example of preferred embodiments rather than limiting the scope of the invention. Accordingly, the invention is not to be determined by the embodiments described, but should be determined by equivalents to the claims and the appended claims.

The invention claimed is:

1. A keyword-based data management system, comprising:
    a storage unit configured to include one or more pieces of data and to have multiple storage folders having upper and lower layers and named after keywords-of-interest;
    a history providing unit configured to provide a recommendation list for the multiple storage folders by referencing history information including a use history of the keywords-of-interest when executing an application program installed in a computing device, or configured to make a request for a call of an application program associated with a storage folder for a keyword-of-interest selected by providing the recommendation list;
    a storage folder creation unit configured to create the storage folder;
    a use activity calling unit configured to store data generated by the application program in the multiple storage folders;
    a management setting unit configured to arrange a display order of multiple storage folders included in the recommendation list,
    a storage folder management unit configured to create and delete a storage folder included in the storage unit and data of the storage folder; wherein the storage folder management unit includes;
    a storage folder management module configured to create or delete the storage folder;
    a data management module configured to create or delete data stored in the storage folder or move the data stored in the first storage folder to a second storage folder;
    a report creation module configure to collect multiple pieces of data stored in the storage folder to generate one integrated document report file according to a generated order;
    a recommendation module configured to extract a noun from texts included in multiple pieces of data stored in one storage folder and to create a sub-classified storage folder in proportion to a usage count of the extracted noun to perform movement of the corresponding data;
    a reclassification module configured to reset a current layer of all the storage folders including the sub-classified storage folder to an upper or lower layer; and
    when any one piece of data stored in the storage folder is selected, a launcher providing module configured to provide a launcher for calling an application program associated with the selected data.

2. The system of claim 1, wherein the history providing unit includes:
    a process detection module configured to detect a process residing in a memory according to execution of the application program;
    a recommendation list providing module configured to extract one or more storage folders associated with the application program corresponding to the detected process from the storage unit and to provide a recommendation list for the extracted storage folder; and
    a history management module configured to update the history information according to a usage count of the keyword-of-interest.

3. The system of claim 1, wherein the storage folder creation unit includes:
    a storage folder creation module configured to provide a creation button displayed separately from the recommendation list and a name to create a storage folder having the name as a keyword-of-interest when the creation button is selected; and
    a metadata generation module configured to generate metadata in which a usage count of the storage folder generated by the storage folder generation module is recorded.

4. The system of claim 1, wherein the use activity calling unit includes:
    a data storage request module configured to make a request to the history providing unit or the storage folder creation unit for storing, in an associated storage folder, data generated in the application program being executed;

an application calling module configured to call another application program to generate and store additional data for the associated storage folder; and a URL extraction module configured to extract URL information included in execution of the application program and to insert the URL information into data of the associated storage folder.

5. The system of claim 4, wherein the application calling module is configured to provide, on a screen, an icon list including icons for one or more associated application programs when the data is selected and, when the application program is selected among from the icon list, transmits the selected data as an argument value of the selected application program.

6. The system of claim 4, wherein the history providing unit is configured to display the URL information included together with the recommendation list when the URL information is included in the generated data, and to call an application program corresponding to a web browser to be moved to a corresponding web site when the displayed URL information is selected.

7. The system of claim 4, wherein a name of the data is composed of any one of the keyword-of-interest, an identification code, and a combination of the keyword-of-interest and the identification code, and the identification code is any one of a text, a tag name, and a file creation date that are input by a user or selected by the computing device.

8. The system of claim 1, wherein the management setting unit includes:

a use degree arranging module configured to arrange a display order of items in the recommendation list according to usage time for multiple keywords-of-interest; and a popularity degree arranging module configured to arrange the display order of the items in the recommendation list according to a usage count for the multiple keywords-of-interest.

9. A keyword-based data management method, comprising:

by a history providing unit, detecting execution of an application program installed in a computing device;

by the history providing unit, providing a recommendation list for multiple storage folders included in a storage unit according to history information including a use history of keywords-of-interest associated with the application program in which the execution is detected;

by an use activity calling unit, storing data generated by the application program in an associated storage folder; and by the history providing unit, updating the history information according to a usage count of each of the multiple storage folders and data stored in the multiple storage folders;

after the updating of the history information, by a storage folder management unit, extracting a noun from a text included in multiple pieces of data stored in one storage folder;

by the storage folder management unit, generating a sub-classified storage folder in proportion to a usage count of the extracted noun; and by the storage folder management unit, transferring the data to the sub-classified storage folder.

10. The method of claim 9, further comprising:

between the detecting of execution of the application program and the providing of the recommendation list, by a storage folder creation unit, creating at least one storage folder upon selecting a provided creation button; and by the history providing unit, registering a use history of a keyword-of-interest for the storage folder in the history information.

11. The method of claim 9, further comprising:

after the updating of the history information, by a storage folder management unit, generating or deleting the storage folder included in the storage unit or the data of the storage folder; and by the history providing unit, reflecting, on the history information, a use history of the keyword-of-interest for the created or deleted storage folder or the data.

12. The method of claim 9, further comprising:

after the updating of the history information, by a management setting unit, resetting a current layer of all the storage folders to an upper or lower layer.

13. The method of claim 9, further comprising:

after the updating of the history information, by a management setting unit, calling an application program associated with data for which a provided launcher is selected when any one piece of data of the data stored in the storage folder is selected.

14. The method of claim 9, further comprising:

after the updating of the history information, by a management setting unit, arranging a display order in an ascending or descending order according to any one of character orders of a last usage time, a use count, and a name of the keyword-of-interest for the multiple storage folders in the recommendation list.

15. The method of claim 9, wherein a name of the data is composed of any one of the keyword-of-interest, an identification code, and a combination of the keyword-of-interest and the identification code, and the identification code is a text, a tag name, or a file creation date that is input by a user or selected by the computing device.

* * * * *